United States Patent [19]
Reinke

[11] Patent Number: 5,875,667
[45] Date of Patent: Mar. 2, 1999

[54] APPARATUS FOR FORMING A SLIGHTLY OPEN SHELL FOR LOADING OF PRODUCT

[75] Inventor: Stephen M. Reinke, Rochester, N.Y.

[73] Assignee: Eastman Kodak Company, Rochester, N.Y.

[21] Appl. No.: 978,496

[22] Filed: Nov. 25, 1997

[51] Int. Cl.⁶ .............. B21D 5/00; B21D 11/10; B23P 19/04
[52] U.S. Cl. .............. 72/155; 72/156; 72/379.4; 29/806
[58] Field of Search .............. 72/155, 156, 139, 72/142, 379.4, 148; 413/71, 69, 1; 29/806

[56] References Cited

U.S. PATENT DOCUMENTS

| | | | |
|---|---|---|---|
| 224,526 | 2/1880 | Gage | 72/155 |
| 518,816 | 4/1894 | Hulbert | 72/139 |
| 2,940,232 | 6/1960 | Wallace et al. | |
| 3,062,266 | 11/1962 | Abbott | 72/155 |
| 3,466,845 | 9/1969 | Beekes et al. | |
| 3,586,258 | 6/1971 | Horlezeder | |
| 4,080,711 | 3/1978 | Kawada et al. | 29/430 |
| 4,115,913 | 9/1978 | Moriya et al. | 29/806 |
| 4,614,019 | 9/1986 | Shimizu et al. | 29/806 |
| 5,044,144 | 9/1991 | Foote | 29/806 |
| 5,105,535 | 4/1992 | Fotte | 29/806 |
| 5,117,688 | 6/1992 | Reinke | 29/806 |
| 5,125,254 | 6/1992 | Reinke et al. | 29/306 |
| 5,172,470 | 12/1992 | Ichikawa et al. | 29/806 |
| 5,174,019 | 12/1992 | Lancy | 29/806 |
| 5,179,855 | 1/1993 | Kato et al. | 29/806 |
| 5,367,897 | 11/1994 | Hume | 72/155 |

*Primary Examiner*—Daniel C. Crane
*Attorney, Agent, or Firm*—Clyde E. Bailey, Sr.

[57] ABSTRACT

A substantially rectangular metal blank (18) is formed about a mandrel (14) to provide a slightly open shell (28) having a pair of axially extending lips (20c, 20t) separated by a distance sufficient to permit a prewound spool (10) and its film leader or other product to be inserted axially into the shell prior to closing the shell about the spool or other product.

4 Claims, 10 Drawing Sheets

APPARATUS FOR FORMING A SLIGHTLY OPEN SHELL FOR LOADING OF PRODUCT

FIELD OF THE INVENTION

The present invention concerns an apparatus for forming slightly open shells for prewound spools of web material. More particularly, the invention concerns such apparatus which are suitable for use with photographic film or similar sensitized web materials.

BACKGROUND OF THE INVENTION

A considerable variety of apparatus have been developed over the years for packaging prewound spools of web material. For example, U.S. Pat. No. 2,940,232 discloses such an apparatus for use with photographic film in which strips of film are wound on spools, after which the wound spools are inserted axially into previously formed cylindrical magazine shells to which one end cap has already been applied, the shells having axially extending lips through which the leader of the film strip extends in the familiar manner. The cap for the open end of the shell is later applied. U.S. Pat. No. 3,466,845 discloses a multistation packaging apparatus in which a bendable chipboard blank is pressed into an elongated arcuate shape having an axially extending slot through which a wound core of product can be inserted, after which end caps are applied. U.S. Pat. No. 3,586,258 shows an apparatus for winding photographic film in which a previously formed magazine is provided which has axially extending lips. The spool is automatically oriented within the magazine to permit a guide tongue to insert film through the lips and into engagement with the core of the spool, after which the film is wound onto the spool within the magazine. U.S. Pat. No. 4,080,711 discloses another apparatus in which the film is inserted into an already complete magazine and wound onto the spool within the magazine. U.S. Pat. Nos. 4,115,913 and 4,614,019 show somewhat different types of methods and apparatus for winding film and loading prewound spools into magazines, in which the magazine shells are preformed with a rather wide axially extending slot, to facilitate axial insertion of a prewound spool of film, after which the shells are closed and end caps are applied.

While automatic packaging apparatus and methods of the types just discussed have achieved a measure of acceptance and success over the years, a need has continued to exist for apparatus and methods, without sacrificing quality of the finished package or damaging the product during the packaging process. Particularly for winding and packaging photographic films and other sensitized materials which must be handled in near total darkness, a need has existed for such more productive equipment which would require a minimum of operator intervention during use.

SUMMARY OF THE INVENTION

The primary objective of the invention is to provide an improved apparatus for forming a slightly open shell into which a product can be loaded axially between axially extending lips of the shell, but which can be closed to a good right circular cylinder with minimal constraints during closing, the cylinder being suitable for installation of circular end caps.

This objective is given only by way of an illustrative example; thus, other desirable objectives and advantages inherently achieved by the disclosed apparatus of the invention may occur or become apparent to those skilled in the art. Nonetheless, the scope of the invention is to be limited only by the appended claims.

In accordance with a preferred embodiment of the invention, there are provided a substantially rectangular metal blank for the side wall of a substantially cylindrical magazine for a spool, the blank having an opposed pair of axially extending lips and an opposed pair of end edges; and a mandrel having an exterior surface about which the blank may be formed. The exterior surface is uniquely configured in accordance with the invention so that when the blank is formed about the exterior surface from near one lip to near the other and the blank is then removed from the mandrel, the blank springs to a slightly open form in which the axially extending lips are spaced sufficiently far apart to permit a prewound spool or other product to pass axially between the lips. The blank is formed about the mandrel and then removed. A prewound spool or other product may then be inserted between the lips and the slightly open shell may then be closed about the spool, after which the end caps may be applied. The prewound spool may have a trailing end of web material which projects outwardly between the lips after the shell is closed; however, the method of the invention is also applicable to spools whose trailing end is contained within the magazine after the shell is closed.

In the apparatus according to the invention, a source of substantially rectangular blanks of the type previously discussed is provided. A forming mandrel is used which has an exterior surface of the type previously described. Preferably, means are provided for roll forming the blanks about the mandrel from near one axially extending lip to near the other; however, other techniques for forming about the mandrel may be used. For example, the slightly open shell may be formed by several die segments that move in radially around the mandrel, by elastomeric dies that engage the very open form shell and yield as the shell is wrapped about the mandrel or by inflatable tools which form the shell about the mandrel.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
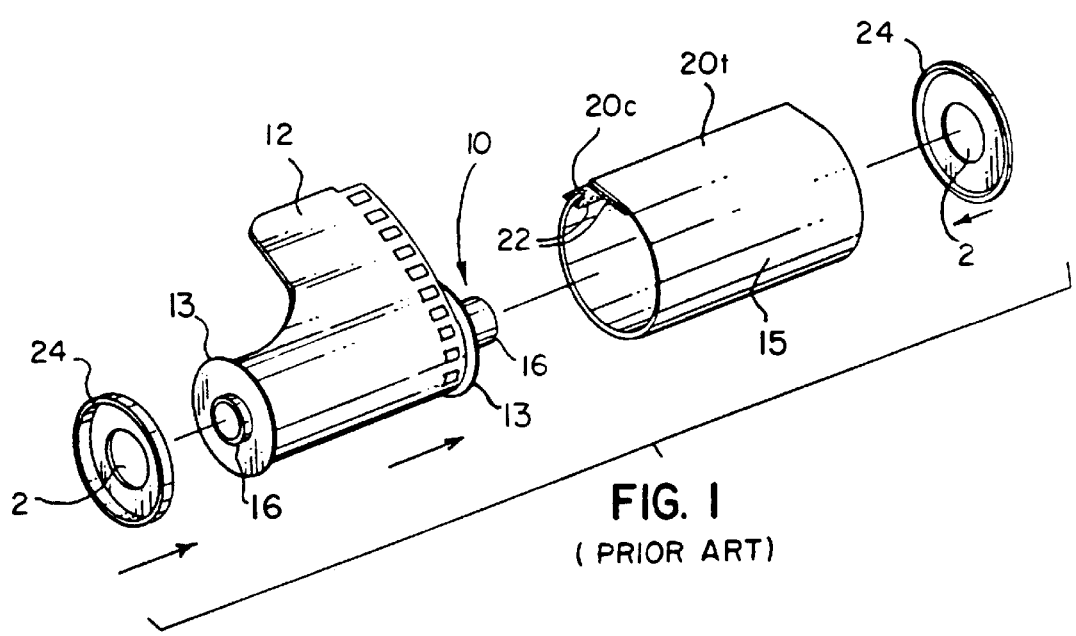
FIG. 1 shows an exploded perspective view of a known type of magazine for photographic film, illustrating one prior art technique for inserting a prewound spool axially into the shell of the magazine and applying the end caps.

The following is a detailed description of the preferred embodiments of the invention, reference being made to the drawings in which the same reference numerals identify the same elements of structure in each of the several Figures.

PRIOR ART METHOD

FIG. 1 illustrates a known process for loading photographic film magazines. A spool 10 has been used which comprises a central core, not illustrated, on which is wound a strip 12 of photographic film. Spool 10 includes a pair of end flanges 14 from which extend hollow axial hubs 16. A preformed, round cylindrical metal shell 15 has been used which comprises a pair of axially extending lips 20c, 20t between which strip 12 is withdrawn from or wound back into the magazine in use by the consumer. These axially extending lips typically are different in geometry, lip 20c being folded or crimped back on itself and lip 20t being essentially tangent to the round cylindrical preformed shell 15. Typically, preformed shell 15 has been formed from a substantially flat rectangular blank 18, illustrated in FIG. 3, in which lips 20c, 20t have previously been formed. To prevent leakage of light into the magazine, lips 20c and 20t have for many years been covered with a lightlock material 22 such as black velvet or plush which firmly but gently engages the surfaces of the film and prevents light leakage into the magazine.

The ends of the magazine are closed by a pair of annular end caps 24, each having an aperture 2 for rotatably receiving hubs 16 and a circumferentially extending groove and flange for fixedly engaging the end edges of round preformed shell 15. Such magazines have been assembled by inserting the prewound spool of film axially into round preformed shell 15 and then applying and staking end caps 24. While this spooling and assembling process is reliable and has been rather widely used, the apparatus for practicing the process tends to be less reliable.

OVERALL OPERATION

Figure 2:
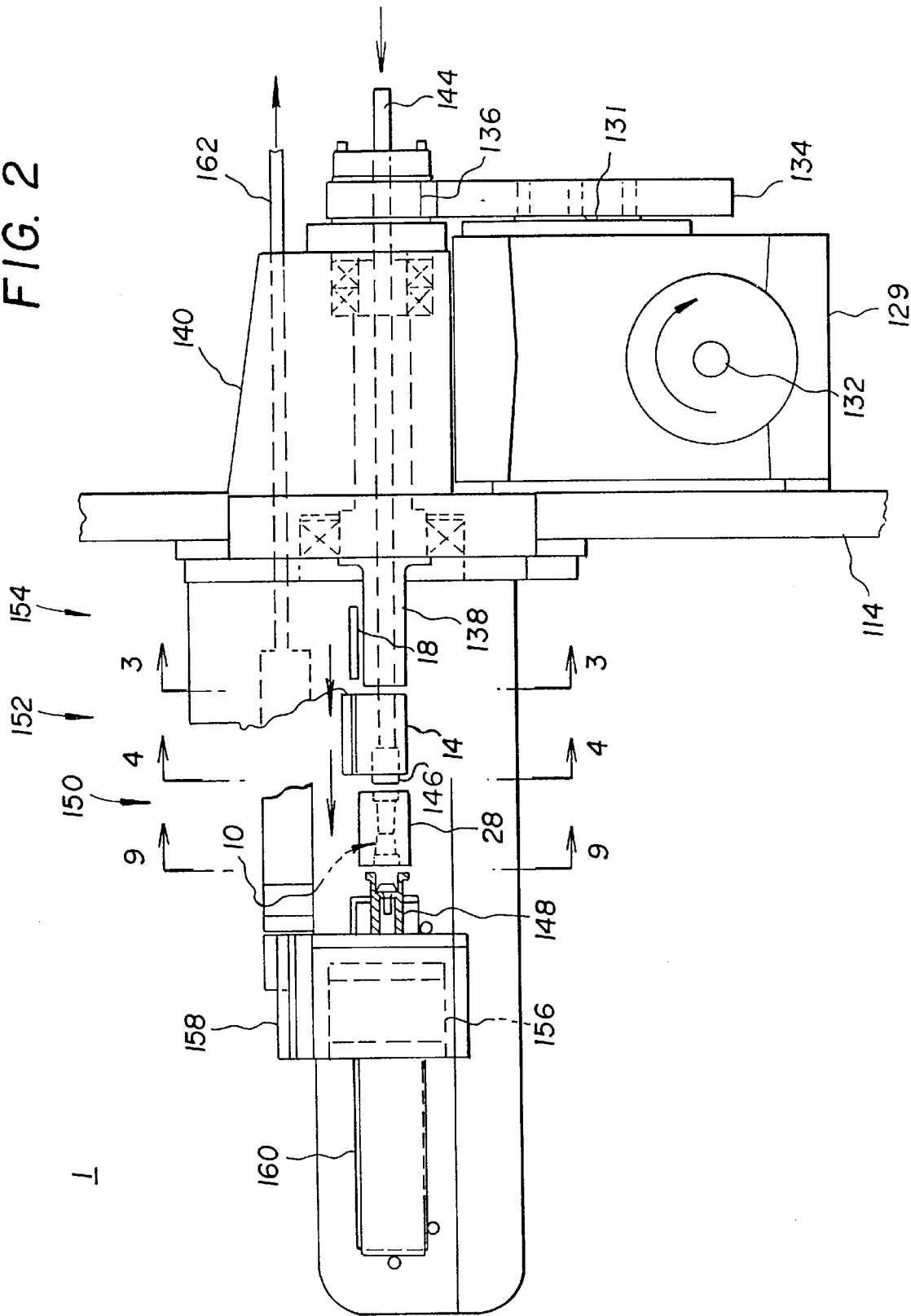
FIG. 2 is a right side view of the forming mandrel and film winding devices.

FIG. 2 illustrates the overall layout of the apparatus 1 according to the invention. A rigid, vertically standing face plate 114 is preferred to provide a mount for the components of the invention; however, face plate 114 may be oriented differently or replaced with a structural framework without departing from the scope of the invention. A shell blank feeding mechanism (not shown) receives substantially flat, rectangular metal blanks 18 to be formed into the cylindrical side wall of the completed magazine, each blank having been previously provided with lips 20c, 20t and lightlock strips 22. The shell blanks 18 are fed one at a time to a rotatable forming mandrel 14. As a rectangular metal blank 18 is fed into the mandrel 14, it is captured by the mandrel and is then subjected to a forming operation. During forming, a contact forming roller 168 (see FIG. 6) engages the rectangular metal blank 18 as the blank rotates through about one revolution which results in the slightly open shell 28 being formed about the mandrel 14. After the slightly open shell 28 is formed about the rotatable mandrel 14, it is allowed to spring open and is removed from the mandrel 14 by a shell removal mechanism (not shown).

Shell Feeding and Roll Forming Stations 154, 152

Figure 3:
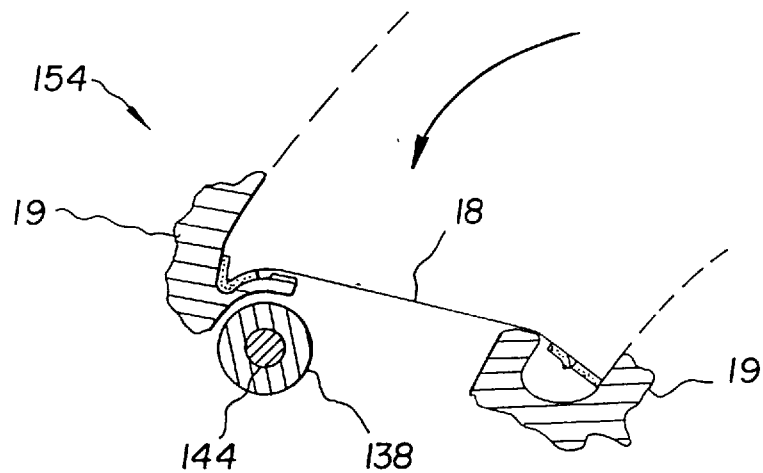
FIG. 3 is a section view of the apparatus along line 3—3 of FIG. 2 illustrating the first form blank load position.

Referring to FIGS. 2–11 the apparatus 1 of the invention is illustrated in various stages during the formation of a slightly open shell and positioning of the shell over a prewound spool of film at its wind station 150. In FIG. 2, the first form blanks 18 are delivered to apparatus 1 in a stack (not shown) so that the apparatus 1 can form slightly open form shells 28 at a constant rate without stopping. The bottom first form blank of the stack 18 shown in FIG. 3 is positioned in the mandrel load position 154 via a fixed nest 19. The nest 19 positions the first form blank's crimp lip 20c and tangent lip end 20t so it is aligned with the rotatable forming mandrel 14, best seen in FIGS. 3, 4 and 13. The nest 19 and first form blanks 18 are configured relative to apparatus 1 so as to clear the forming mandrel shaft 138.

Figure 4:
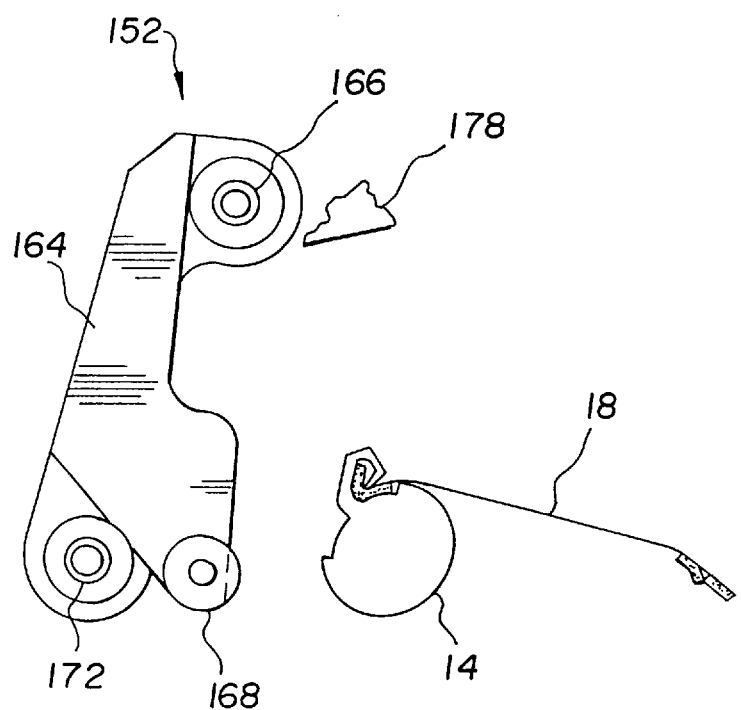
FIG. 4 is section view of the apparatus along line 4—4 of FIG. 2 illustrating the first form blank loaded on mandrel position.

According to FIG. 4, the positioned bottom first form blank 18 is pushed forward by a device (not shown) onto the rotatable forming mandrel 14 at the forming station 152.

Figure 5:
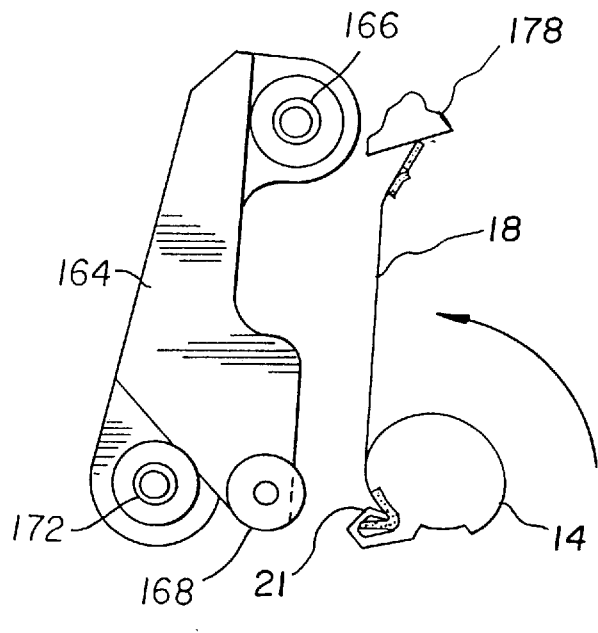
FIG. 5 is a partial end view of the apparatus showing the first form blank and mandrel rotated to a stop position.

Referring to FIG. 5, the rotatable forming mandrel 14 rotates counter clockwise (CCW) and stops when the first form blank's 18 tangent lip 20t, is loaded against fixed stop 178. At this time, the first form blank's crimp lip end 20c is also loaded against the forming mandrel datum blade 21, shown in FIG. 13, which provide an accurate means for locating and forming the open form shell 28.

Figure 6:
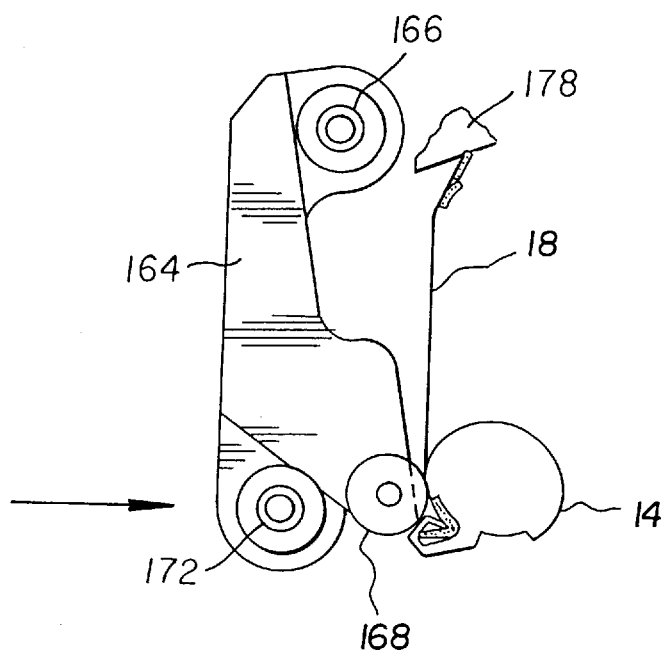
FIG. 6 is a partial end view of the apparatus illustrating the forming roller engaged against first form blank.

FIG. 6 illustrates the forming roller 168 being engaged near the crimp lip end 20c of the first form blank 18.

Figure 7:
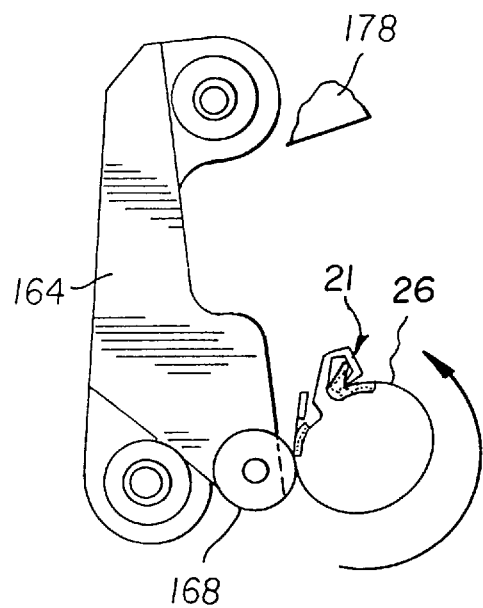
FIG. 7 is a partial end view of the apparatus showing the forming mandrel rotated to form a shell.

In FIG. 7, the forming mandrel 14 and first form blank 18 rotate CCW again, creating a tightly wrapped formed shell 26 which is not yet sprung open. The rotatable mandrel 14 has rotated back to the same first form blank 18 load position as seen in FIG. 4.

Figure 8:
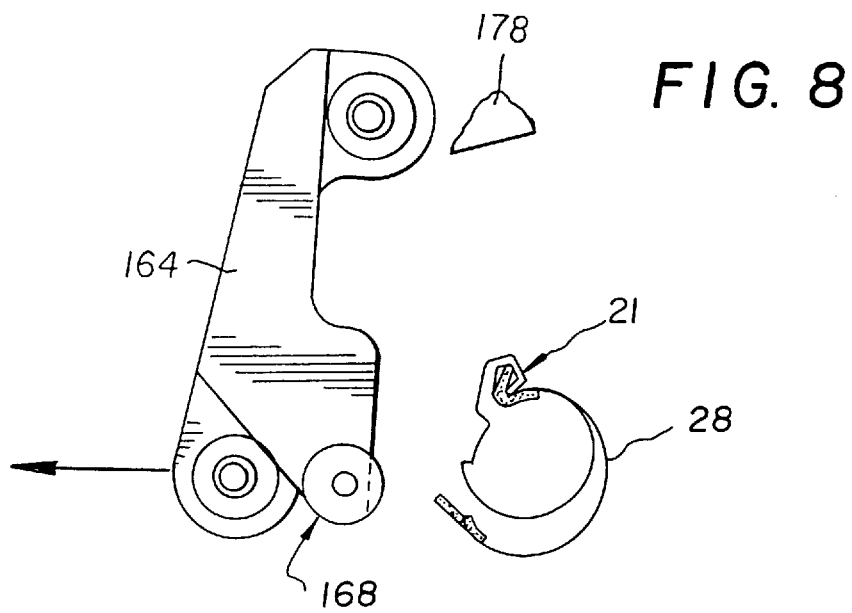
FIG. 8 is a partial end view of the apparatus illustrating the forming roller retracted and shell sprung open.

As shown in FIG. 8, the forming roller 168 is retracted and the open form shell 28 is sprung open and its crimp lip 20c is still located by the mandrel datum blade 21.

Figure 9:
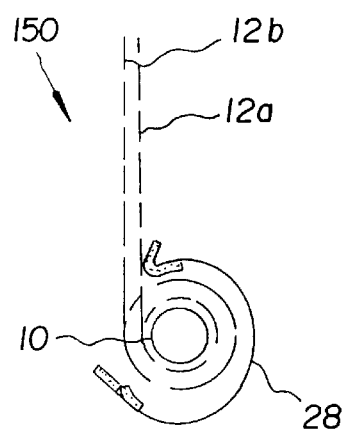
FIG. 9 is a partial end view, partially sectioned along line 9—9 of FIG. 2, illustrating the open form loaded over wound spool of film.

Referring to FIG. 9, the open form shell 28 is now pushed forward over the wound spool of film 10. FIG. 9 illustrates that at the winding station 150 of FIG. 2, the slightly open form shell 28 clears the wound spool of film 10 and its film leader 12a, 12b (the film leaders for minimum and maximum film scroll sizes respectively).

Figure 10:
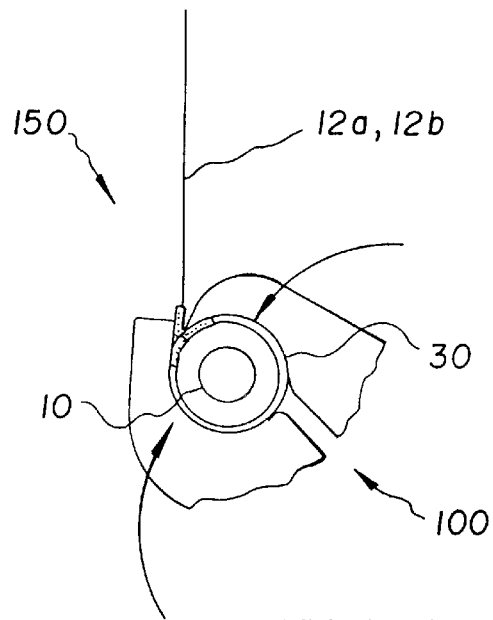
FIG. 10 is a partial end view of the apparatus illustrating a closing jaw form round shell over wound spool of film.

In FIG. 10, the open form shell 28 can be closed to create a round closed shell 30, via a shell closing apparatus 100, around the wound spool of film 10 and transferred to the end cap assembly station (not shown).

Figure 11:
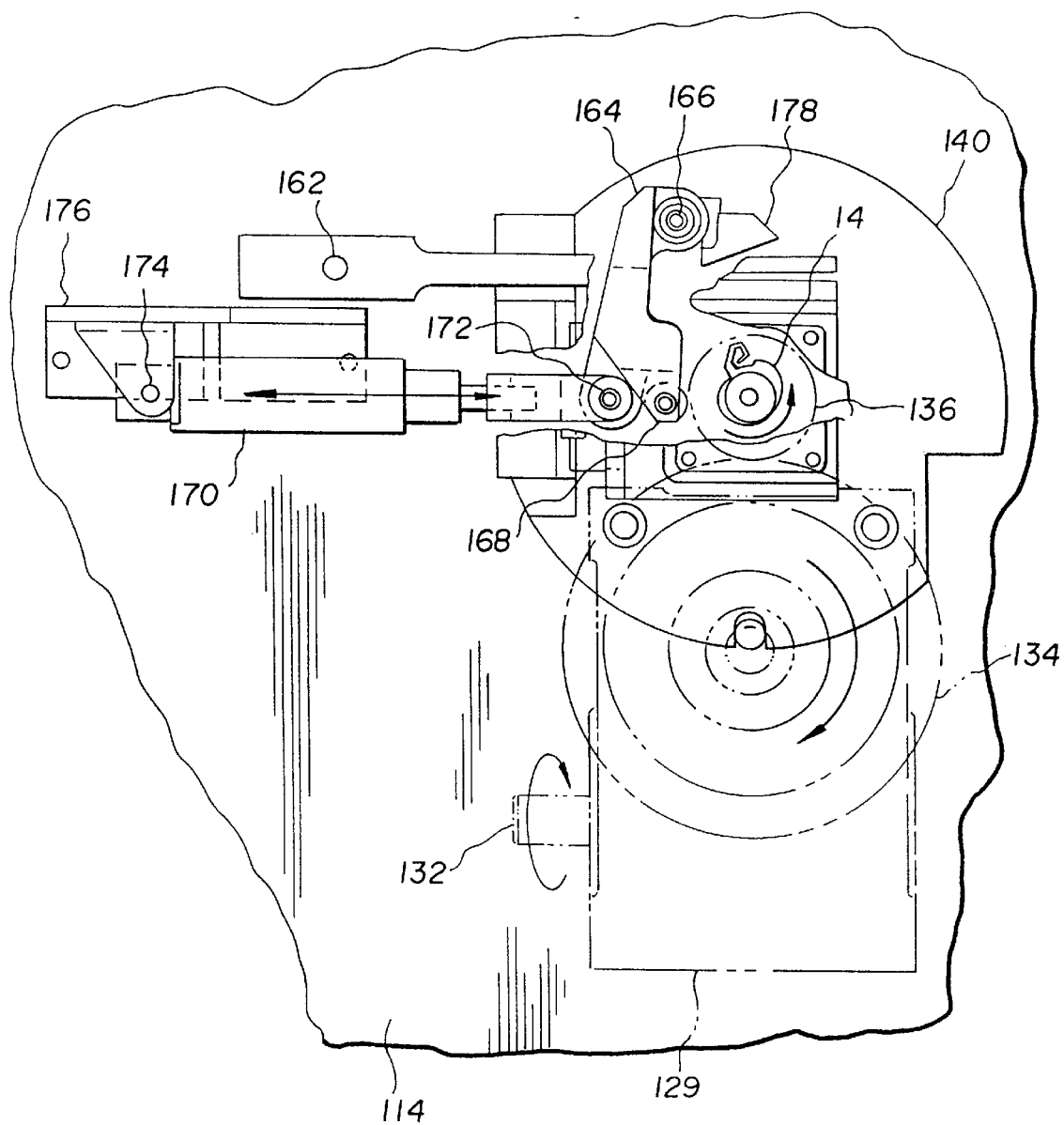
FIG. 11 is a front elevation view of the forming mandrel and forming roller devices (broken view)
Figure 12:
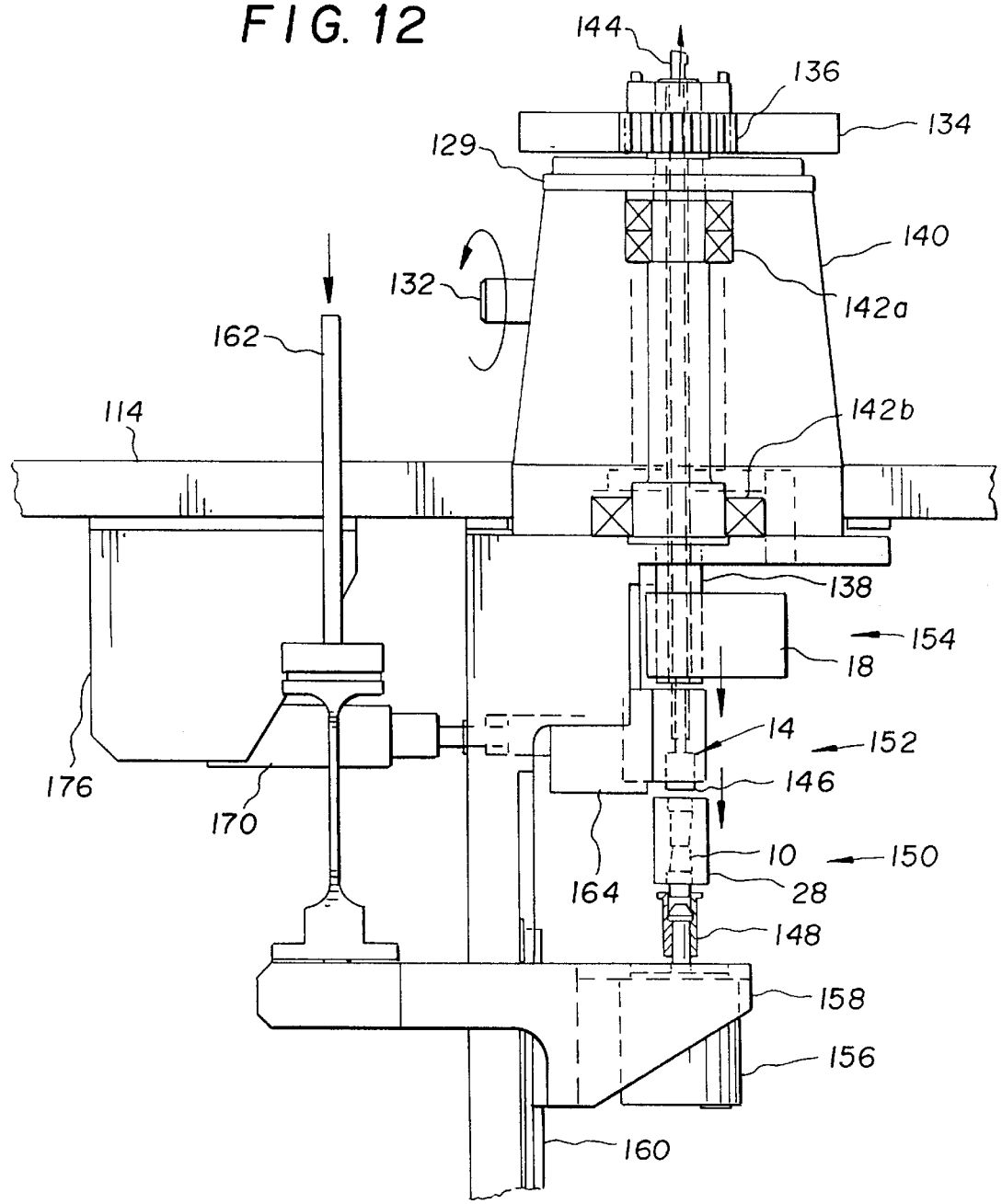
FIG. 12 is a top view of the forming mandrel, film winding and forming roller devices.

Turning now to FIGS. 2, 11, and 12, the apparatus 1 of the invention is illustrated in various views. The rotation and timing of the rotatable forming mandrel 14 is achieved by any suitable commercially available drive means, preferably a cam indexing drive 129 (such as from the Commercial Cam., Inc. (Camco) of Wheeling, Ill.). The cam drive 129 is mounted to a machine frame member 114. As shown in FIG. 1, the cam drive 129 provides two clockwise (CW) indexes for both rotating the first form blank 18 to its stop position, and for the forming of the open form shell 26 (as seen in FIG. 7). Between each index of cam drive 129 are dwells which proved the time for the forming roller 168 to be engaged, and for the first form blank 18 to be loaded as the open form shell 28 is unloaded off its forming mandrel 14. The input shaft 132 of the cam drive 129 is driven at a constant speed via the machine drive (not shown).

Referring to FIG. 2, a spur gear 134 is attached to the output flange 131 of the cam drive 129. The spur gear 134 drives a pinion gear 136 which is mounted to the mandrel shaft 138. The end of the mandrel shaft 138 supports the forming mandrel 14.

Referring again to FIGS. 2 and 12, the mandrel shaft 138 rotates within housing 140 which is fixed to the machine frame 114. The mandrel shaft 138 is captured by bearings 142a, 142b within the housing 140.

In FIG. 2, another important aspect of this invention is that the first form load position 154, the forming station 152 and the winding station 150 are configured coaxially adjacent to each other. Within the forming mandrel shaft 138 an inboard quill shaft 144 is supported. The end of the inboard quill assembly 146 which engages the film spool 10. The inboard quill shaft 144 and quill assembly 146 are able to be actuated in and out within the mandrel 14 and shaft 138 by an independent means not shown.

According to FIGS. 2 and 12, likewise, the outboard quill assembly 148 that engages the film spool 10 also moves in and out by these same independent means. The outboard quill assembly 148 is mounted to the shaft of a winding motor 156 which in turn is supported by a bracket 158.

Referring again to FIGS. 2 and 12, motor bracket 158 is mounted to a linear slide 160 which is supported from the cantilevered end of housing 140. FIG. 12 illustrates the other end of bracket 158 which is connected to the outboard quill drive link 162 which provides the means for the in and out motion of the outboard quill assembly 148 and its winding motor 156.

Depicted in FIG. 11, the forming station 152 which cooperates with rotatable mandrel 14 for forming the slightly open shell 28 is illustrated. A support link 164 is pivotally mounted to housing 140 via a spherical type bearing 166. The forming roller 168 is rotatably supported by the support link 164. Also connected to support link 164, via pivot 172, is the actuating air cylinder 170 which provides a constant forming force during the forming process. The forming roller 168 rolls freely against the unsprung open shell 26, thus eliminating relative motion and scratches. The opposite end of the air cylinder 170 is supported by bracket 176 via pivot joint 174. The bracket 176 is fixed to the machine frame 114.

Figure 13:
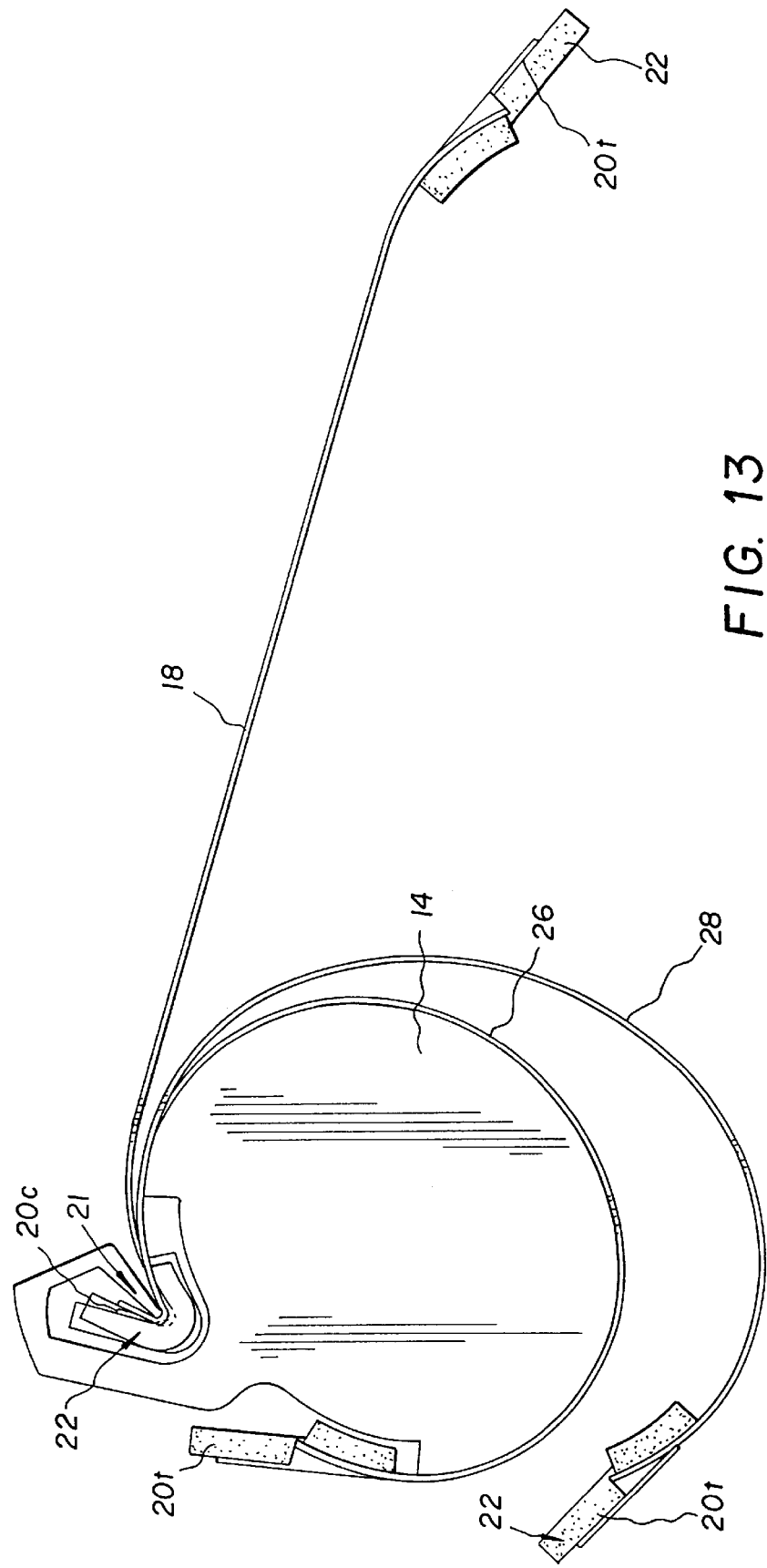
FIG. 13 is a schematic illustrating various stages of first form blank and open form on the forming mandrel.
Figure 14:
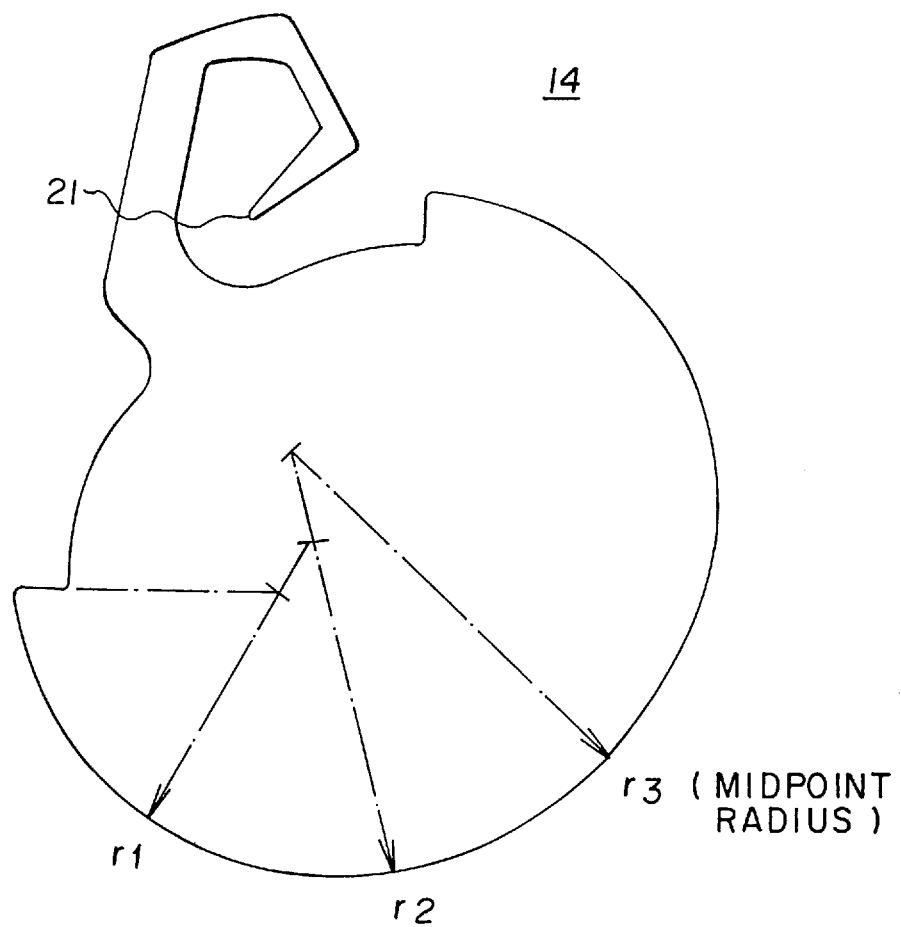
FIG. 14 is a plan end view of the forming mandrel of the invention.

FIG. 13 illustrates the various stages the first form blank 18 goes through to create the preferred slightly open form shape 28. The mandrel 14 has a special shape made up of various tangent arc segments as seen in FIG. 14. It is important to note that the open form mandrel 14 was designed to clear various film leader positions 12a, 12b of a wound spool 10.

Geometry of Forming Mandrel 76

Figure 15:
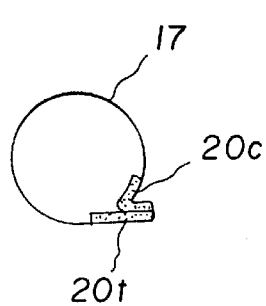
FIG. 15 shows a simplified cross-sectional view of a magazine of the type assembled in accordance with the invention; and, FIG. 16 shows a geometric construction illustrating how the geometry of the mandrel can be determined from the open shell geometry of FIG. 13.
Figure 16:
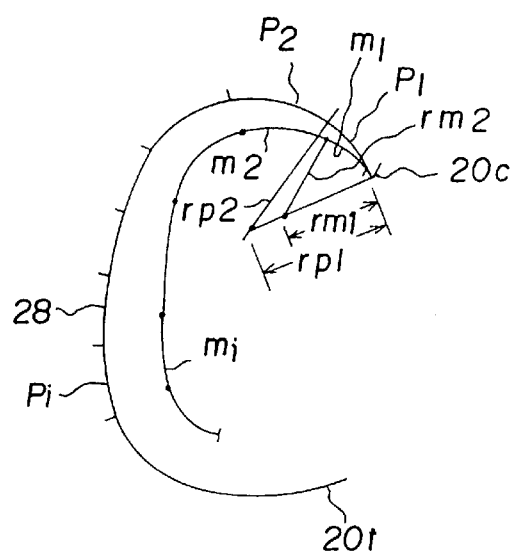

FIGS. 14–16 illustrate a preferred technique for determining the geometry of the exterior surface of mandrel 14 about which the shell blank 18 is formed. The objectives in determining this geometry are to ensure that when a substantially flat, rectangular metal shell blank 18 is formed about the exterior surface from near lip 20c to near lip 20t and the blank is then removed from the mandrel, the blank will spring to a slightly open form 28 in which lips 20c, 20t are spaced sufficiently far apart as seen in FIG. 9 to permit the open form shell with lips 20c, 20t to pass axially over a previously wound spool with varying leader positions 12a, 12b; and, that after axial insertion of the slightly open shell, the shell can be closed to form a substantially round cylindrical shell to which end caps 24 can be readily applied.

Using commercially available software such as NASTRAN published by the McNeal Schwendler Corporation for modeling preformed substantially round metal shell 17, a simplified computer based model of the shell is created as illustrated in FIG. 15. Assuming that lip 20t is held fast; that there are no internal stresses in the shell; that the material of the shell has the lowest yield strength anticipated in the actual product and the actual thickness to be used in the product; and that the stress-strain curve of the material has a positive slope, shell 17 is deflected by applying force to lip 20c, pulling upward and spreading the lips as viewed in FIG. 9 while permitting lip 20c to move laterally if needed. The force is then removed and the model is allowed to relax to its free standing condition. The force applied is increased or decreased until the spacing between lips 20c, 20t in the relaxed condition is sufficient to permit axial insertion of the slightly open shell over the prewound spool 10 and its extended leader 12a, 12b. This technique produces a model of slightly open form shell 28 as shown in FIG. 9. As shown in FIGS. 13 and 16, the radius of curvature of very open form shell 28 decreases from about the midpoint of the shell to near lips 20c, 20t.

Using finite element analysis and assuming that the model of slightly open shell 28 has no internal stresses and no memory of having once been round as in FIG. 15, as would be the case for a shell formed from an originally flat blank, the model can then be closed back to the configuration of FIG. 15 to confirm that the shell will close to a good, round cylindrical shape suitable for installation of end caps. Then, using material of the desired thickness and the lowest anticipated yield strength, a series of tests are conducted to develop plots showing for mandrels of different radii, the radii to which parts spring back following roll forming around the mandrel; that is, plots of part radius versus mandrel radius. Such plots can be modeled using commercially available software and it can be shown that where t is the thickness of the shell material and a, b and c are constants. Then, as shown in FIG. 16, the model of very open form shell 28 is broken into small but not necessarily equal length arc segments P1 to Pi along its circumference. From the computer model of very open shell 28, the radius rp1 of shell 28 at lip 20c can be determined, which is the radius at the beginning of segment P1. From the value of rp1, the corresponding radius rm1 of mandrel 14 to produce rp1 can be calculated using the relationship given above. With minor adjustment for the thickness of the wall of shell 28, the length of segments P1 to Pi along the circumference of the shell will be about the same as corresponding segments M1 to Mi along the circumference of the mandrel. Using radius rm1 and assuming that the radius is perpendicular to the beginning of its corresponding segment M1 near lip 20c, the location of the center for rm1 can be determined and segment M1 can be constructed as illustrated. Then, the computer determines from the model for shell 28 the radius rp2 for the beginning of segment P2, calculates rm2, locates the center for rm2 and constructs segment M2 of the surface of the mandrel. This process is then repeated for each segment of slightly open shell 28 until the geometry of a mandrel surface has been determined, as shown in FIG. 16 on which shell blanks can be roll formed to produce a slightly open form shell 28. As indicated by the preceding calculations and geometric constructions and as shown in FIGS. 9, 15, and 16, the exterior surface of mandrel 14 has a circumferentially changing radius of curvature; that is, mandrel 14 is non-circular. Because the shape of the mandrel is determined using the lowest yield strength material, the mandrel will produce proper slightly open form shells 28 with higher yield strength materials as well and such shells will also close to a good cylindrical form. As best seen in FIGS. 13 and 14 and in a manner similar to the shape of slightly open form shell 28, the radius of curvature of mandrel 14 decreases from about the midpoint of the surface of the mandrel to points near the lips 20c, 20t.

Though our invention has been described with regard to the forming of a single slightly open shell, those skilled in the art will understand from the disclosure that the mechanisms of the forming station, in cooperation with the blank feeding mechanism. The synchronization of the mechanisms to achieve such operation is well within the skill of those in the mechanical arts.

PARTS LIST 1 overall apparatus
2 aperture
10 spool
12 strip of photographic film
12a film strip minimum winding
12b film strip maximum winding
13 end flanges
14 forming mandrel
15 round cylindrical metal shell
16 hollow axial hubs
17 round form shell
18 form or shell blank
19 next
20c, 20t crimp and tangent lip
21 datum blade
22 light lock material/strips
24 annular end caps
26 unsprung open shell
28 open shell
30 closed shell
100 shell closing apparatus
114 frame member
129 drive means/cam indexing drive
131 output flange
132 input shaft
134 spur gear
136 pinion gear
138 shaft
140 housing
142a, 142b bearings
144 inboard quill shaft
146 inboard quill assembly
148 outboard quill assembly
150 winding station
152 forming station
154 first form load position
156 winding motor
158 motor bracket
160 slide
162 outboard quill drive link
164 forming roller support link
166 bearing
168 forming roller
170 air cylinder
172 pivot
174 pivot
176 cylinder bracket
178 fixed stop

I claim:

1. Apparatus for forming a slightly open shell for a substantially cylindrical magazine for prewound spools of a strip of material, comprising: a source of substantially rectangular metal blanks for the side walls of such substantially cylindrical magazines, each said blank having an opposed pair of axially extending lips and an opposed pair of end edges;

a rotatable mandrel means for forming each of said blanks, said rotatable mandrel having an axis of rotation arranged coaxially adjacent to said prewound spool, and wherein said rotatable mandrel means having a circumferentially extending convex exterior surface against which each of said blanks is formed between said lips during rotation of said rotatable mandrel means, said exterior surface terminating in two edges near which said lips of each of said blanks are positioned during forming with said exterior surface being entirely convex between said edges of said rotatable mandrel, said exterior surface having a circumferentially changing radius of curvature terminating in a member extending from said exterior surface for capturing and securing one of said lips, said radius of curvature decreasing from about the midpoint of said exterior surface in each direction to said edges on said exterior surface which during forming are contacted by said blank near said lips, said midpoint being located on said exterior surface at a point about equally spaced from said two edges where said lips contact said exterior surface, said exterior surface being configured so that each of said blanks, formed around said rotatable mandrel means against said exterior surface from near one of said lips to near the other, said one of said lips springs away from said exterior surface before removal to a slightly open shell form in which said lips are spaced sufficiently far apart to permit said slightly open shell to be axially loaded over said prewound spool; and, means for pressing each of said blanks into contact with said exterior surface of said rotatable mandrel means from near one of said lips to near the other.

2. Apparatus for forming a slightly open shell for a substantially cylindrical magazine for prewound spools of a strip of material, comprising:

a source of substantially rectangular metal blanks for the side walls of such substantially cylindrical magazines, each said blank having an opposed pair of axially extending lips and an opposed pair of end edges;

a rotatable mandrel means for forming each of said blanks, said rotatable mandrel having an axis of rotation arranged coaxially adjacent to said prewound spool, and wherein said rotatable mandrel means having a circumferentially extending exterior surface against which each of said blanks is formed, said exterior surface having a circumferentially changing radius of curvature terminating in a member extending from said exterior surface for capturing and securing one of said lips, and being configured so that each of said blanks, formed onto said rotatable mandrel means against said exterior surface from near one of said lips to near the other upon rotation as said rotatable mandrel means, said one of said lips springs open upon removal from said exterior surface to a slightly open shell form in which said lips are spaced sufficiently far apart to permit said slightly open shell form to be axially loaded over said prewound spool;

means for pressing each of said blanks into contact with said exterior surface of said rotatable mandrel means from near one of said lips to near the other;

at least one frame for supporting said rotatable mandrel means;

means for positioning each of said metal blanks on said rotatable mandrel means prior to forming;

roller means for contacting said metal blank near said one clamped lip;

means for moving said roller means against said rotatable mandrel means to roll form said metal blank; and means for rotating said rotatable mandrel after one end of said metal blank is fixed against a portion of said exterior surface for forming said slightly open shell form.

3. Apparatus according to claim 2, further comprising means for resiliently biasing said roller means into contact with said metal blank, whereby said blank is pressed against said exterior surface of said mandrel means as said roller means moves about said mandrel means.

4. Apparatus according to claim 1 wherein said member extending from said exterior surface has a substantially hooked shape, said hooked being formed by folding a portion of said member inwardly toward said exterior surface.

* * * * *